(12) United States Patent
Stein et al.

(10) Patent No.: US 6,829,694 B2
(45) Date of Patent: Dec. 7, 2004

(54) RECONFIGURABLE PARALLEL LOOK UP TABLE SYSTEM

(75) Inventors: Yosef Stein, Sharon, MA (US); Haim Primo, Tikwa (IL)

(73) Assignee: Analog Devices, Inc., Norwood, MA (US)

( * ) Notice: Subject to any disclaimer, the term of this patent is extended or adjusted under 35 U.S.C. 154(b) by 290 days.

(21) Appl. No.: 10/131,007

(22) Filed: Apr. 24, 2002

(65) Prior Publication Data

US 2003/0149857 A1 Aug. 7, 2003

Related U.S. Application Data

(60) Provisional application No. 60/355,337, filed on Feb. 7, 2002.

(51) Int. Cl.[7] .............................................. G06F 12/00
(52) U.S. Cl. ...................... 711/206; 711/216; 711/217; 711/219; 711/220; 711/221; 711/170
(58) Field of Search ................................ 711/206, 211, 711/216, 219, 220, 221, 170, 171, 172, 217, 202

(56) References Cited

U.S. PATENT DOCUMENTS

| | | | |
|---|---|---|---|
| 3,303,477 A | | 2/1967 | Voigt |
| 5,062,057 A | * | 10/1991 | Blacken et al. ............. 345/567 |
| 5,101,338 A | | 3/1992 | Fujiwara et al. |
| 5,386,523 A | | 1/1995 | Crook et al. |
| 5,696,941 A | | 12/1997 | Jung |
| 5,832,290 A | | 11/1998 | Gostin et al. |
| 5,996,057 A | | 11/1999 | Scales, III et al. |
| 5,996,066 A | | 11/1999 | Yung |
| 6,138,208 A | | 10/2000 | Dhong et al. |
| 6,223,320 B1 | | 4/2001 | Dubey et al. |
| 6,285,607 B1 | * | 9/2001 | Sinclair ...................... 365/200 |
| 6,480,845 B1 | * | 11/2002 | Egolf et al. .................... 707/6 |
| 6,539,477 B1 | * | 3/2003 | Seawright .................... 713/100 |
| 2003/0103626 A1 | * | 6/2003 | Stein et al. ................... 380/42 |
| 2003/0133568 A1 | * | 7/2003 | Stein et al. ................... 380/37 |
| 2004/0145942 A1 | * | 7/2004 | Leijten-Nowak ............ 365/154 |

* cited by examiner

*Primary Examiner*—Hong Kim
(74) *Attorney, Agent, or Firm*—Iandiorio & Teska (57) ABSTRACT

A reconfigurable parallel look-up table system includes a memory; a plurality of look-up tables stored in the memory; a row index register for holding the values to be looked up in the look-up tables; a column index register for storing a value representing the starting address of the look-up tables stored in the memory; and an address translation circuit responsive to the column index register and the row index register to simultaneously generate an address for each value in the row index register to locate in parallel the function of those values in each look-up table.

6 Claims, 7 Drawing Sheets

RECONFIGURABLE PARALLEL LOOK UP TABLE SYSTEM

RELATED APPLICATIONS

This application claims priority of U.S. Provisional Application 60/355,337 entitled 8 WAY PARALLEL LOOK-UP TABLE to Stein et al., filed Feb. 7, 2002.

FIELD OF THE INVENTION

This invention relates to a reconfigurable parallel look-up table system

BACKGROUND OF THE INVENTION

Present communication applications such as current second generation (2G) personal digital assistants (PDA's), as well as the new (3G) mobile wireless handsets/terminals, call for MPEG-4 streaming video protocol. The latest generation video compression/decompression standards primarily targeted at devices with medium-speed data communication links. Look-up tables are massively used in both technologies. For example, in communication, forwarded error correction (Reed-Solomon) usually uses a 256 Galois field look-up table, data encryption algorithms like (DES/3DES, AES) use eight 64 byte look-up tables for the selection boxes (S-Box). In video streaming, protocols such as JPEG, MPEG-2, MPEG-4 and Windows Media, uses Huffman look-up tables for variable length coding (VLC). Traditional DSP and controllers access these tables serially which result in slow response time.

Typically, once these tables are designed for a particular task they are not adaptable for other uses. As a result, serially accessible look-up tables limit the speed of operation of communication and image processing applications.

BRIEF SUMMARY OF THE INVENTION

It is therefore an object of this invention to provide an improved reconfigurable parallel look-up table system.

It is a further object of this invention to provide such an improved reconfigurable parallel look-up table system which can access a number of look-up tables simultaneously.

It is a further object of this invention to provide such an improved reconfigurable parallel look-up table system which is easily reconfigurable to access different numbers and different sizes of look-up tables.

It is a further object of this invention to provide such an improved reconfigurable parallel look-up table system which is faster and more flexible.

The invention results from the realization that a truly faster and more flexible look-up table system can be achieved by enabling a number of look-up tables in a memory to be accessed simultaneously by combining the values to be looked up with the values representing the starting addresses of the look-up tables to simultaneously translate each value into an address to locate in parallel the function of those values in each look-up table.

This invention features a reconfigurable parallel look-up table system including a memory and a plurality of look-up tables stored on the memory. A row index register holds the values to be looked up in the look-up tables, and the column index register stores the value representing the starting address of each of the look-up tables stored in the memory. An address translation circuit is responsive to the column index register and the row index register to simultaneously generate an address for each value in the row index register to locate in parallel the functions of those values in each look-up table.

In a preferred embodiment, the address translation circuit may include a multiplier circuit for multiplying the value representing the starting address by the length of each column and an adder circuit for combining the value in the row index register with the output of the multiplier circuit. The address translation circuit may include an OR circuit for combining the values from the row index register with the values in the column index register shifted toward the MSB by N bits in respect to the values in the row index register. The look-up tables may be all the same size.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
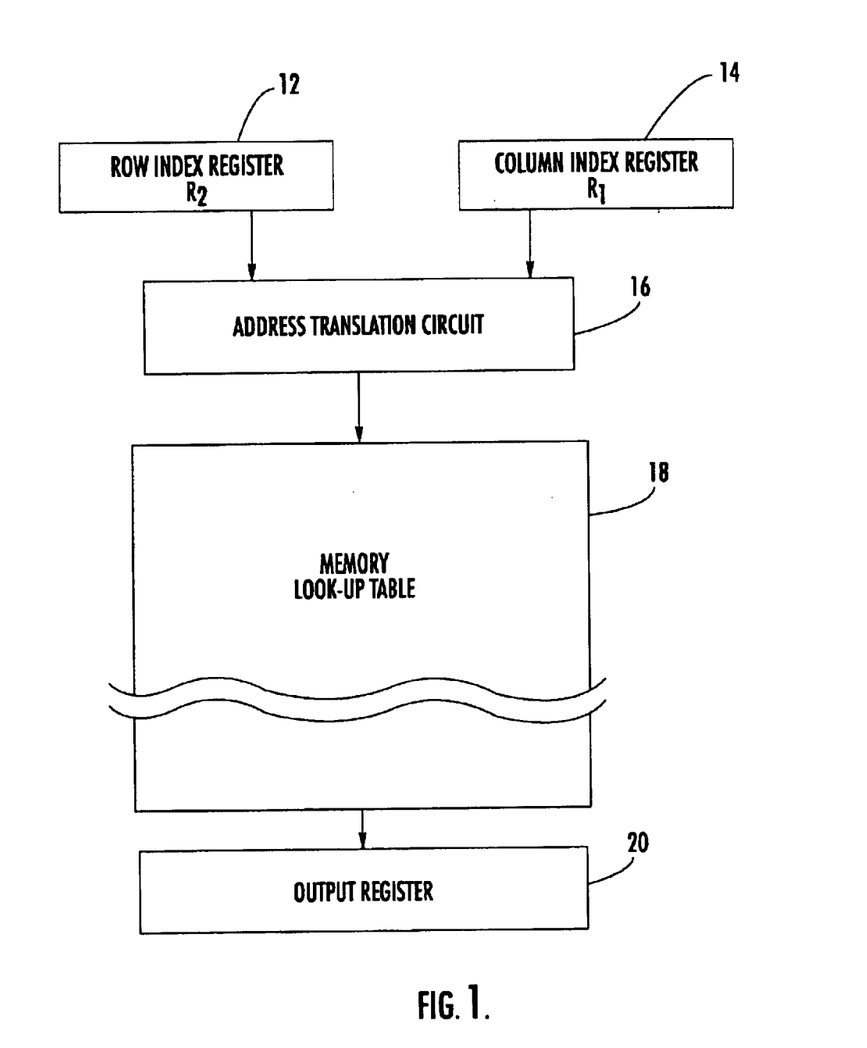
FIG. 1 is a simplified block diagram of a reconfigurable parallel look-up table system according to this invention.

There is shown in FIG. 1 a reconfigurable parallel look-up table system 10 according to this invention which includes a row index register $R_2$, 12 and a column index register $R_1$, 14, an address translation circuit 16 and a memory 18 which contains a number of look-up tables. The output from memory 18 is delivered to output register 20. Memory 18 includes a number of look-up tables and row index register 12 holds the values to be looked up in those look-up tables. For example, row index register 12 may hold the angles that are to be looked up in the look-up tables at memory 18 where each of the look-up tables has a different function, one of the sine value, cosine value, tangent value, and so on for those angles. Column index register 14 stores a value representing the starting address of each look-up table stored in the memory. For example, if memory 18 holds eight look-up tables of 64 bytes each, the starting points for those look-up tables which coincide with the columns 30, 32, 34, 36, 38, 40, 42, 44 will be 0, 64, 128, 192, 256, 320, 384, and 448.

Address translation circuit 16 combines the value in the row index register 12 with a representation of the starting address of each of the look-up tables to simultaneously generate an address for each value in the index register to locate in parallel the function of those values in each look-up table.

Figure 2:
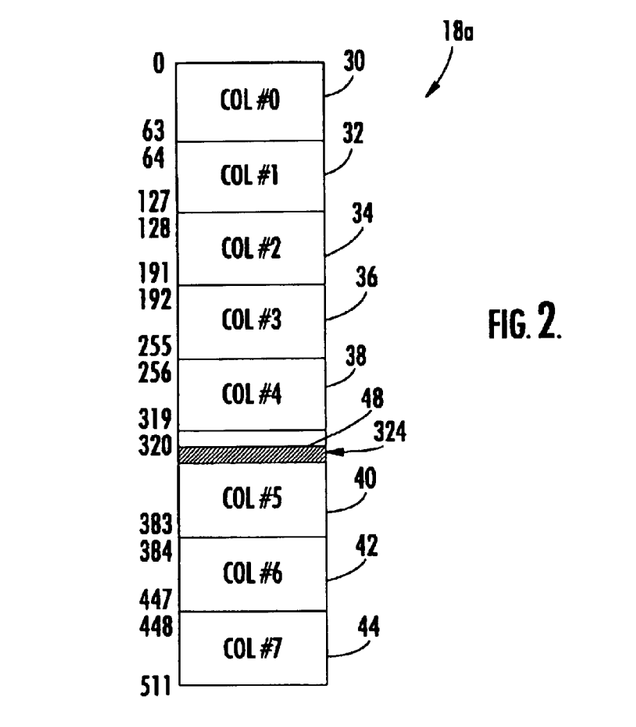
FIG. 2 is a schematic diagram of a typical linear memory structure.
Figure 3:
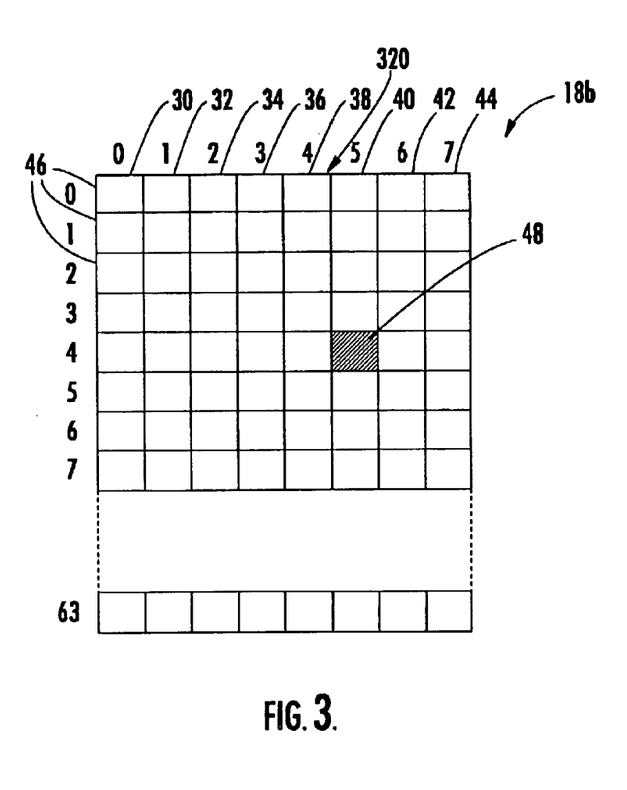
FIG. 3 is a schematic diagram illustrating the columns of FIG. 2 arranged in a side by side look-up table arrangement.
Figure 4:
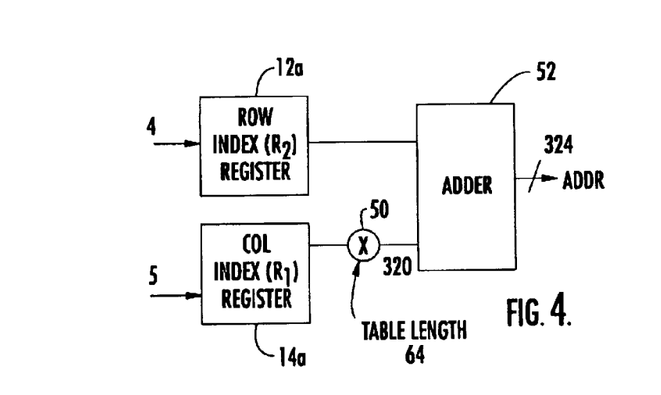
FIG. 4 is a simplified schematic diagram illustrating one approach to combining the row and column index register values to obtain an address for locating value functions in look-up tables.

Memories are typically made in a linear fashion as shown in FIG. 3 for manufacturing convenience. Thus a memory that has a storage capacity of 512 bytes each byte comprising eight bits will be constructed as indicated by memory 18a, FIG. 2, where there are eight columns 30–44 running one after another and containing rows of bytes 0–63, 64–127, 128–191, 192–255, 256–319, 320–383, 384–447, 448–511. Assuming that each of the columns 30–44 are equal in length, memory 18a will more likely be envisioned as memory 18b, FIG. 3 where each of the columns 30–44 are envisioned in side by side position each extending for sixty-four rows 46, numbered 0–63. Assuming then that the area to be addressed is in the fifth column and fourth row, namely shaded area 48, this can be seen in FIG. 2 as the $324^{th}$ row in the 0–511 rows depicted there. In order to address this particular location 48, in the memory look-up table of FIG. 3, one could multiply the column number 5, in column index register 14a, FIG. 4, by the length of a table (sixty-four) in multiplier 50 to produce the number 320. If this number 320 is added to the index register 12a corresponding to the fourth row, the output of adder 52 will be 324, precisely the address of location 48 shown as row 4 and column 5 in FIG. 3, also shown directly as address 324 in FIG. 2.

Figure 5:
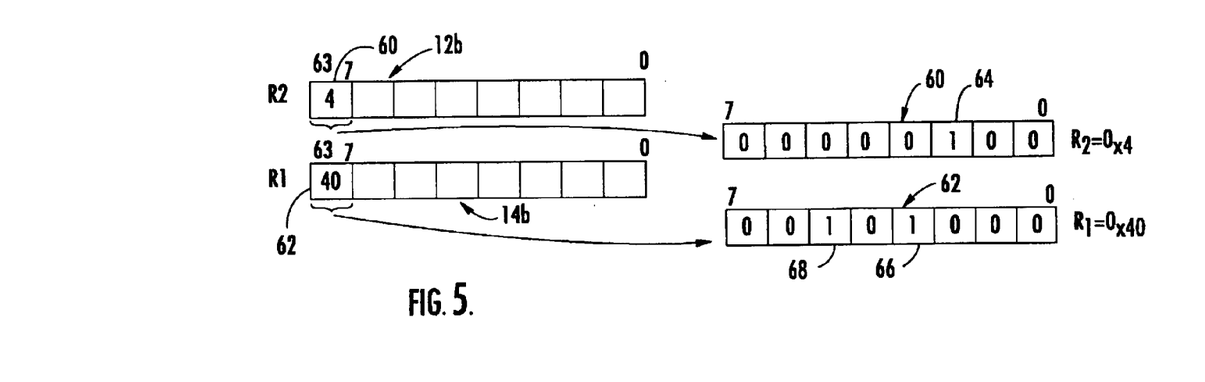
FIG. 5 is a schematic diagram of the row and column index registers according to this invention to accomplish the address generation described in FIG. 4.
Figure 6:
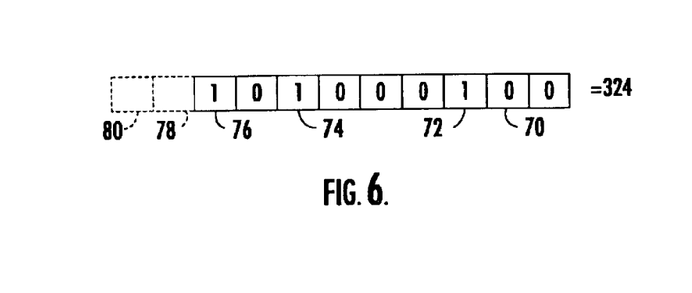
FIG. 6 is a graphical illustration of the shifting and combination of the eight bits of information in each of the stages of the register of FIG. 5 showing the ultimate address generation effected.

The same concept can be achieved digitally much more efficiently and simply, as shown in FIG. 5, where the row index register 12b and the column index register 14b are shown as eight stage registers, each stage representing a byte, each byte of 8bits. There in the first stage 60 resides the number four as previously, but in the first stage 62 of register 14b resides the number forty, because this number will be multiplied by eight due to a hardwired shift of three bits to provide the number 320 as previously explained. More particularly the expanded view of stage 60, FIG. 6, shows the eight bit structure with a "1" in the third bit position, 64, representing binary four. Stage 62 of register 14b is shown with its eight bits having a "1" in the fourth and sixth bit position where the "1" bit at 66 represents an eight and the "1" bit at 68 represents thirty-two for a total of forty. However, as shown graphically at FIG. 6, the eight bits from stage 62 of register 14b have been shifted three bits to the left relative to the eight bits of stage 60 from register 12b. This effectively multiplies by eight the value in stage 62. When the two are then combined, typically OR-ed together, the result is the nine bit address 70, where the ones present at the third bit 72, seventh bit 74 and ninth bit 76 represent the number 256+64+4=324 which is the proper address as explained with respect to FIGS. 2 and 3 previously.

Figure 7:
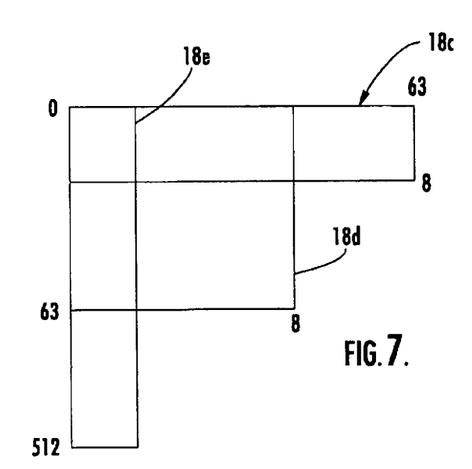
FIG. 7 illustrates a sample of the number of different configurations of look-up tables that may be achieved with this invention.

There are two additional bits available, 78, 80 if it is desired to take the system beyond 512 to 1024 or 2048 memory locations respectively. The shift of three bits is chosen to provide a multiplier of eight since an eight byte register is used and it is not desirable to permutate inside the eight byte size. The structure of this invention results in an easily reconfigurable system since the starting point of any particular look-up table can be established simply by choosing a desired starting point, dividing it by eight and storing that number in stage 62, and each of the other stages in register 12b can have the same or different values representing the starting address of the look-up tables so that all of the look-up tables may be the same size or the may be all different sizes. For example, as shown in FIG. 7, one could have a memory 18c with sixty-four look-up tables eight bytes long, 18d with eight look-up tables sixty-four bytes long, or as shown in memory 18e, one look-up table 512 bytes long.

Figure 8:
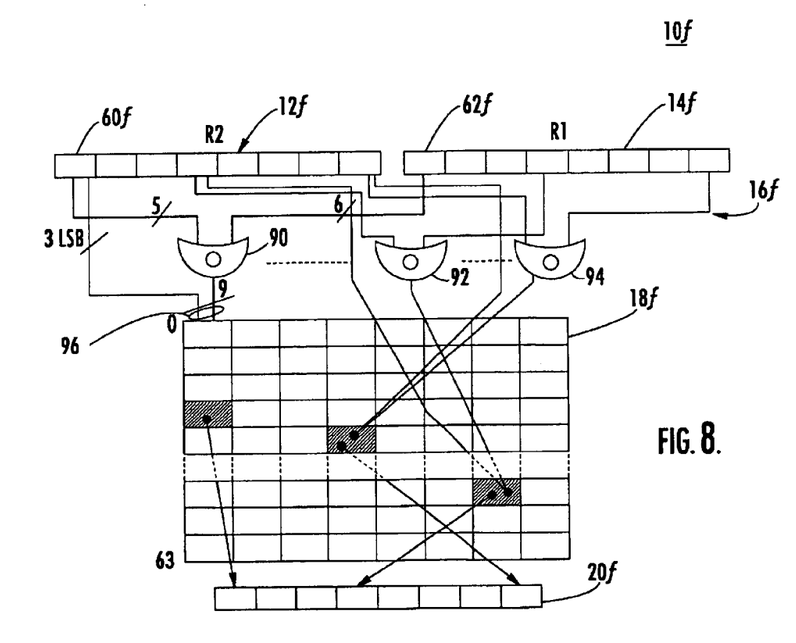
FIG. 8 is a schematic diagram of one embodiment of a reconfigurable parallel look-up table according to this invention.

In one embodiment of this invention, reconfigurable parallel look-up system 10f, FIG. 8 includes row index register 12f and column index register 14f, each of which have eight stages as explained previously with respect to FIG. 6 and a memory 18f which includes eight columns of sixty-four bytes each as illustrated in FIG. 3. In FIG. 8, the address translation circuit 16f includes a number of OR circuits. One OR circuit is associated with each pair of stages from each of registers 12f and 14f. There are thus eight OR circuits, only three of which are shown for clarity, 90, 92 and 94. In operation, OR circuit 90 receives five of the eight inputs from eight bit stage 60f, while the three remaining least significant bits from stage 60 are delivered directly to the memory address bus 96. The other inputs to OR gate 90 are six bits from the first stage 62f of register 14f. These are combined as explained with respect to FIG. 6 so that the five bits from stage 60f and the six bits from the shifted stage 62f are OR-ed to produce a six bit output which is then combined with the three least significant bits from stage 60f to provide the nine bit address on address bus 96. OR circuits 92 and 94 and the other OR circuits omitted for clarity operate in the same way to address locations in memory 18f.

Figure 9:
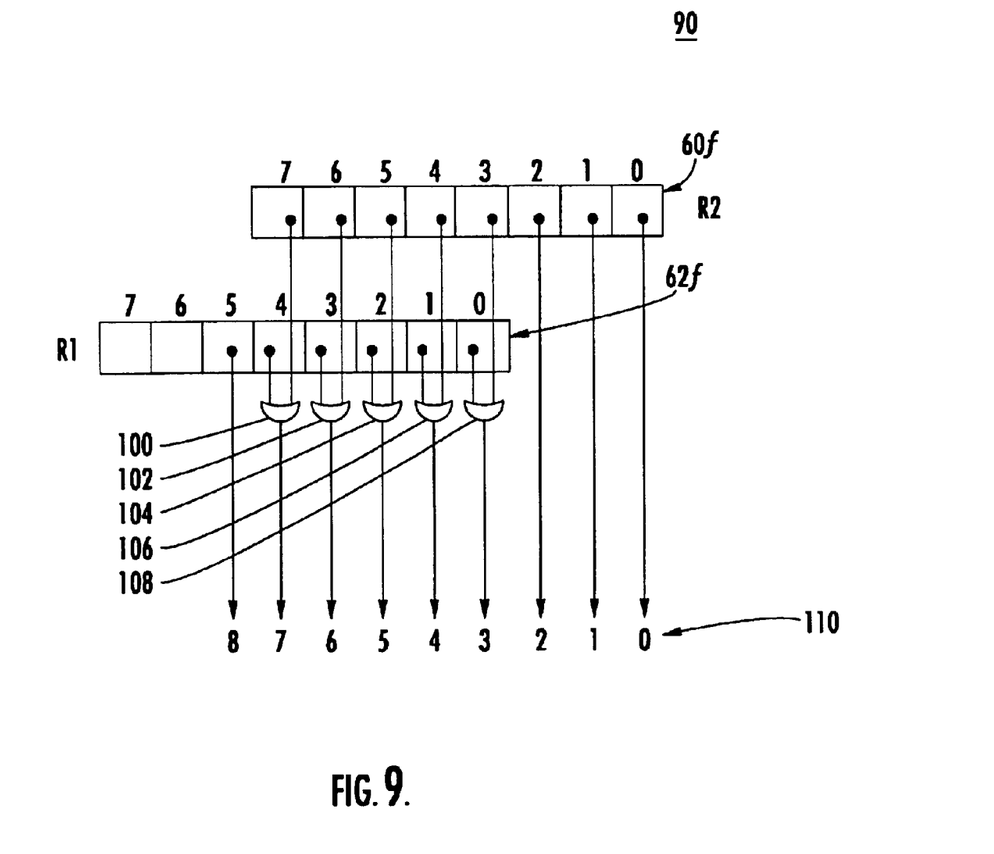
FIG. 9 is a more detailed schematic diagram of one of the OR circuits of FIG. 8.

Each OR circuit as exemplified by OR circuit 90, FIG. 9 includes five OR gates, 100, 102, 104, 106 and 108 which combine the bits from the third, fourth, fifth, sixth and seventh positions of stage 60f with those from positions zero, one, two, three, and four of stage 62f, respectively, with the bits in stage 62 having been shifted by three places with respect to those in stage 60f. The first three bits zero, one, two of stage 60f are delivered directly, not through OR gates, to provide the nine bit address zero-eight at the output 110. The most significant bit from position five in stage 62f is also fed directly and not through any OR gate.

Figure 10:
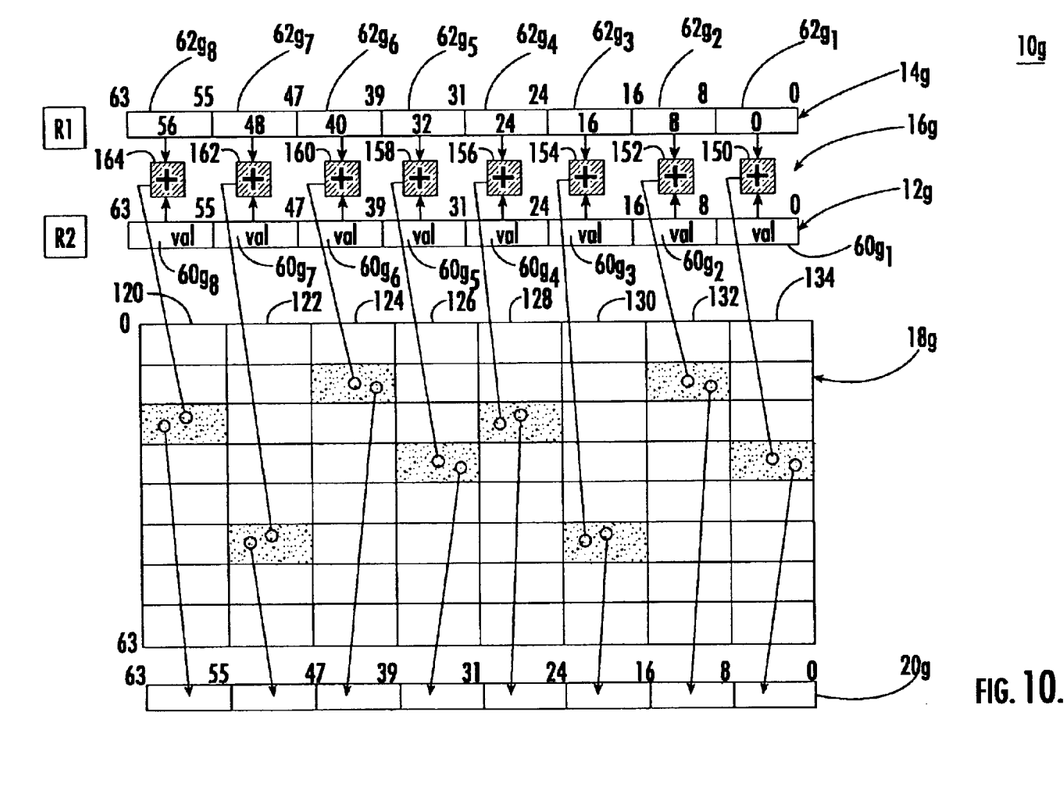
FIGS. 10 and 11 are schematic diagrams showing two different configurations of parallel look-up tables that can be effected according to this invention.

For a reconfigurable parallel look-up table system 10g having eight look-up tables, 120, 122, 124, 126, 128, 130, 132, and 134 each of which has a length of sixty-four bytes, register 14g has stored in its stages 62g1 through 62g8 the values to be looked up, 0, 8, 16, 24, 32, 40, 48, and 56, respectively. Thus, when each of these values is multiplied by the factor eight by virtue of the three bit shift, the starting points of each look-up table will be respectively 0, 64, 128, 192, 256, 320, 384, and 448 as previously explained. The values to be looked up in the look-up tables are stored in each of the stages 60g1–60g8, these values can be stored in merely six bits since there are only sixty-four row addresses in each column or look-up table. The combination of the two values in the stages of registers 14g and 12g are accomplished as previously explained by the shifting and adding accomplished in the OR circuits 150, 152, 154, 156, 158, 160, 162, and 164.

Figure 11:
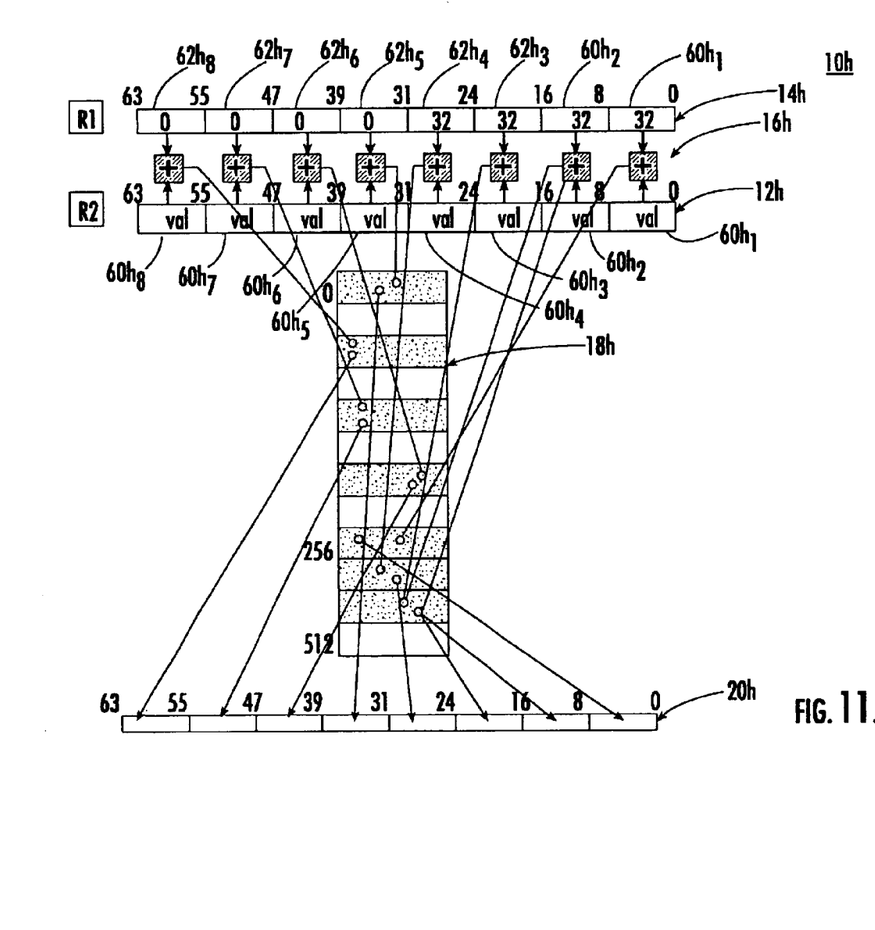

In yet another example, as shown in FIG. 11 the reconfigurable parallel look-up table system 10h according to this invention can be configured to serve two look-up tables, each of 256 bytes by placing the values 32 in each of stages 62h1–62h4 and zeros in the remaining stages 62h5–52h8. By placing the 32's in the first four stages the first four values are going to use the look-up table starting at 256 and going to 511 and the other four values are going to use the look up table starting at zero and going to 255. The values in the stages of the row index register 12h will be expressed now in eight bit form since the number of rows is 256.

Although the illustrations thus far have used eight bit structures, this is not a necessary limitation of the invention.

For example, by repeating the value in two adjacent stages of a row index and adjusting the values in the column index register in accordance with the length of the look-up table as a factor of the basic byte size of eight bits, words of 16 bit, 32 bit and so on can be addressed and looked up. For example in a memory having two look-up tables of 256 bytes each, stages 62h1–62h8 can be loaded alternately with the values 0 and 32, while the stages 60h1–60h8 can be loaded in like pairs so that 60h1 and 60h2 have the same value, 60h3 and 60h4 have the same value, and so on, so that sixteen bit words can be addressed and looked up with the least significant byte (LSB) using the table starting from 0 and going to 255 and the most significant byte (MSB) using the table starting from 256 and going to 511. While the invention is discussed in terms of rows and columns, it can as well be implemented in columns and rows or other ordered arrays.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A reconfigurable parallel look-up table system comprising:

a memory;

a plurality of look-up tables stored in said memory, said system configured to accommodate look-up tables of different sizes;

a row index register for holding the values to be looked up in said look-up tables;

a column index register for storing a value representing the starting address of each said look-up table stored in said memory; and an address translation circuit responsive to said column index register and said row index register to simultaneously generate an address for each value in said row index register to locate in parallel the functions of those values in each look-up table.

2. The reconfigurable parallel look-up table system of claim 1 in which said address translation circuit includes a multiplier circuit for multiplying the value representing the starting address by the length of each column, and an adder circuit for combining the value in said row index register with the output of said multiplier circuit.

3. The reconfigurable parallel look-up table system of claim 1 in which said address translation circuit includes an OR circuit for combining said values in said row index register and said values in said column index register shifted toward the MSB by n bits in respect to the values in the row index register.

4. The reconfigurable parallel look-up table system of claim 1 in which said look-up tables are all the same size.

5. The reconfigurable parallel look-up table system of claim 1 in which at least one of said look up tables is a different size.

6. The reconfigurable parallel look-up table system of claim 1 in which the address generated by the address translation circuit is independent from the previous address generated by the address translation circuit.

* * * * *